US012276477B1

(12) United States Patent
Brown

(10) Patent No.: US 12,276,477 B1
(45) Date of Patent: Apr. 15, 2025

(54) WEAPON-MOUNTABLE BREACHING TOOL

(71) Applicant: Set Point Solutions, LLC, Tampa, FL (US)

(72) Inventor: Joseph Harrington Matanane Brown, Barrigada, GU (US)

(73) Assignee: Set Point Solutions, LLC, Tampa, FL (US)

( * ) Notice: Subject to any disclaimer, the term of this patent is extended or adjusted under 35 U.S.C. 154(b) by 0 days.

(21) Appl. No.: 17/860,992

(22) Filed: Jul. 8, 2022

Related U.S. Application Data

(60) Provisional application No. 63/219,900, filed on Jul. 9, 2021.

(51) Int. Cl.
*F41C 27/06* (2006.01)
*F42B 12/20* (2006.01)
*A62B 3/00* (2006.01)

(52) U.S. Cl.
CPC ............ *F41C 27/06* (2013.01); *F42B 12/204* (2013.01); *A62B 3/005* (2013.01)

(58) Field of Classification Search
CPC ...... F41A 9/70; F41A 9/37; F41A 9/47; F41C 27/06
See application file for complete search history.

(56) References Cited

U.S. PATENT DOCUMENTS

| | | | | |
|---|---|---|---|---|
| 3,365,828 | A * | 1/1968 | Badali | F41A 9/70 42/105 |
| 3,641,691 | A * | 2/1972 | Ellis | F41C 27/06 42/105 |
| 7,021,187 | B1 * | 4/2006 | Grassi | F42C 17/04 89/6.5 |
| 7,409,912 | B2 * | 8/2008 | Cerovic | F41H 13/0018 361/232 |
| 8,839,709 | B1 * | 9/2014 | Crye | F41A 9/74 89/157 |
| 8,991,091 | B2 * | 3/2015 | Griffin | F41C 27/06 42/105 |
| 2001/0042334 | A1 * | 11/2001 | Weichert | F41C 27/06 42/105 |
| 2006/0272193 | A1 * | 12/2006 | Zedrosser | F41C 27/06 42/105 |
| 2015/0107143 | A1 * | 4/2015 | Coetzee | F41G 11/003 42/14 |
| 2016/0153744 | A1 * | 6/2016 | Teetzel | F41C 27/06 42/105 |

* cited by examiner

*Primary Examiner* — Nathaniel C Chukwurah
(74) *Attorney, Agent, or Firm* — Dinsmore & Shohl LLP

(57) ABSTRACT

A breaching system for a primary weapon includes a breaching tool secured at a point below said barrel. The breaching tool may include an exterior sleeve portion that is slidable towards a butt-end of the weapon for firing the breaching tool.

4 Claims, 11 Drawing Sheets

WEAPON-MOUNTABLE BREACHING TOOL

BACKGROUND OF THE INVENTION

The various embodiments and examples disclosed herein disclose a system and method for affixing a breaching tool to a user's weapon such that the user affecting a breaching activity or similar maneuver maintains immediate access to their primary clearance weapon throughout the breaching activity.

When military, law enforcement, or security personnel need to gain access to a locked or otherwise barricaded space, they employ different methods of entry known as breaching. One of the plurality of breaching styles is ballistic breaching wherein a projectile weapon is used to breach an opening. The weapons employed can range from small arms to very large caliber weapons, but in many breaching activities, particularly those associated with door breaching, typically a shotgun is utilized to target the locks and hinges of a door. The manner in which a user or operator typically employ their shotguns to affect a ballistic breach places the user at increased, unnecessary risk. In this specification, the terms "user" and "operator" will be used synonymously to indicate the person engaging in the breaching activity.

Where shotguns are used for ballistic breaching, a shotgun shell, such as a slug, buckshot, birdshot, or frangible rounds are often used to target the locks and/or hinges of a door. Obviously the use of slugs and bird or buckshot enhance the risks of collateral damage, not only to the operator but also to a non-combatant or hostage. In this method of breaching if a door lock can't be damaged or destroyed to the point of opening the door then the hinges must be targeted, thereby requiring additional shots from the breaching implement (shotgun).

Another breaching technique may employ a captive bolt type pistol or implement that utilizes a heavy rod or bolt that is expelled from an instrument barrel by compressed air, a spring mechanism, or an explosive charge. Other ballistic breaching implements that may be used include bangsticks, and various caliber shotgun rounds.

One significant disadvantage of ballistic breaching is the necessity for an operator to release their grip on their primary service weapon to use the breaching weapon. This leaves them vulnerable and requires them to quickly switch back to their primary weapon while simultaneously attempting to effect entry through the door being breached. Thus there is a need in the art for a ballistic breaching tool that can be employed by a user without requiring the user to stow their primary weapon.

BRIEF SUMMARY OF THE INVENTION

The invention described and claimed herein provides a breaching tool that is mounted on an accessory rail or similar mounting system such as a picatinny rail, Weaver Rail, M-LOK, KeyMod, or other equivalent externally mounted accessory rail system. The breaching tool can be advantageously secured below an operator's primary clearance weapon, which can typically be an assault rifle or submachine gun for military and tactical teams, and a handgun for law enforcement officers and security personnel. By providing the breaching tool in various configurations secured below the barrel of the weapon, the operator conducting the breaching activity can be more protected and prepared because the transition from breaching tool to primary clearance weapon will be considerably faster and easier.

A plurality of breaching tool configurations can be secured to the primary weapon, including a conventional ballistic breaching tool such as a shotgun style breacher, a bangstick, a captive bolt tool, or a miniaturized grenade launch type tool. Each of these breaching tools can be readily secured to a primary service weapon to permit quick access to both the breaching tool and to the service weapon, thereby greatly enhancing operator readiness and safety.

The distinctive advantage of the present invention is it affords the operator the ability to maintain the same grasp of their primary weapon that they would have while operating the primary weapon as intended, thereby increasing the likelihood of the operator being able to defend themselves against an unforeseen threat while also ensuring they are able to function quickly and safely as an assault team or entry team member immediately after affecting a successful breach into a targeted space.

BRIEF DESCRIPTION OF THE DRAWING FIGURES

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Figure 1:
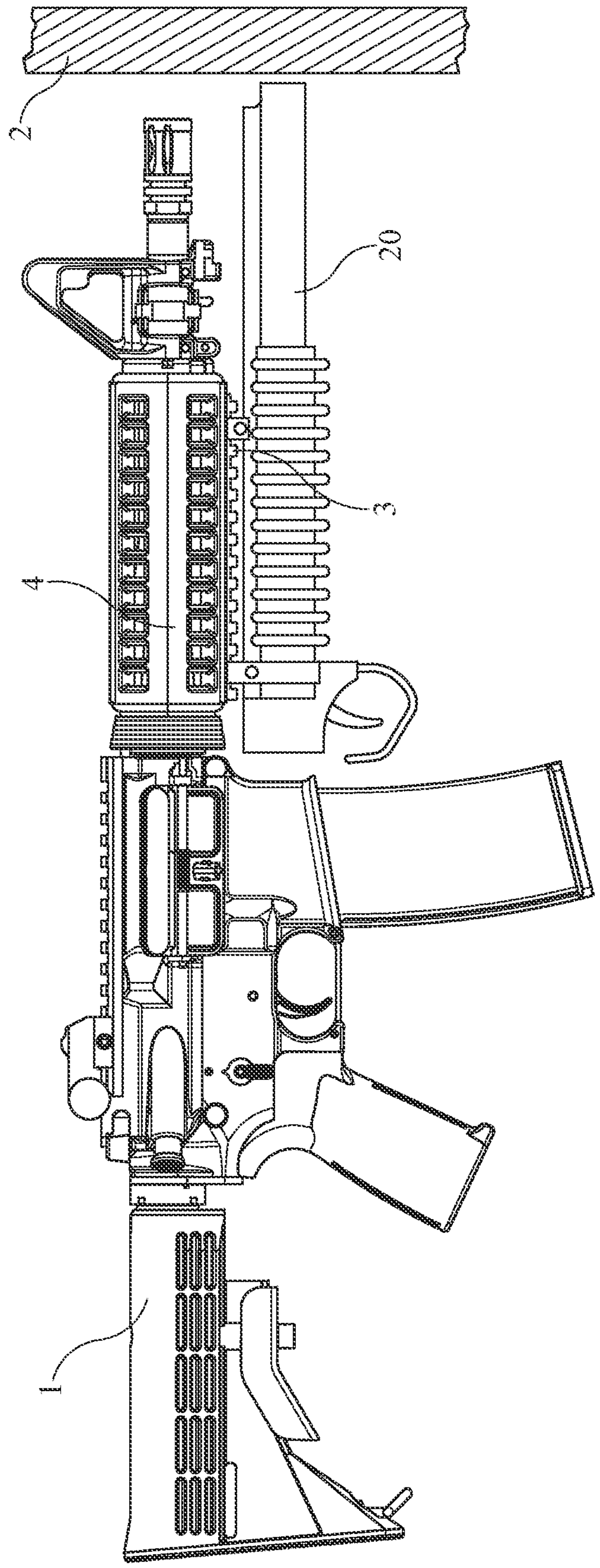
FIG. 1 depicts an exemplary weapon and breaching tool in accordance with some aspects and embodiments.
Figure 2:
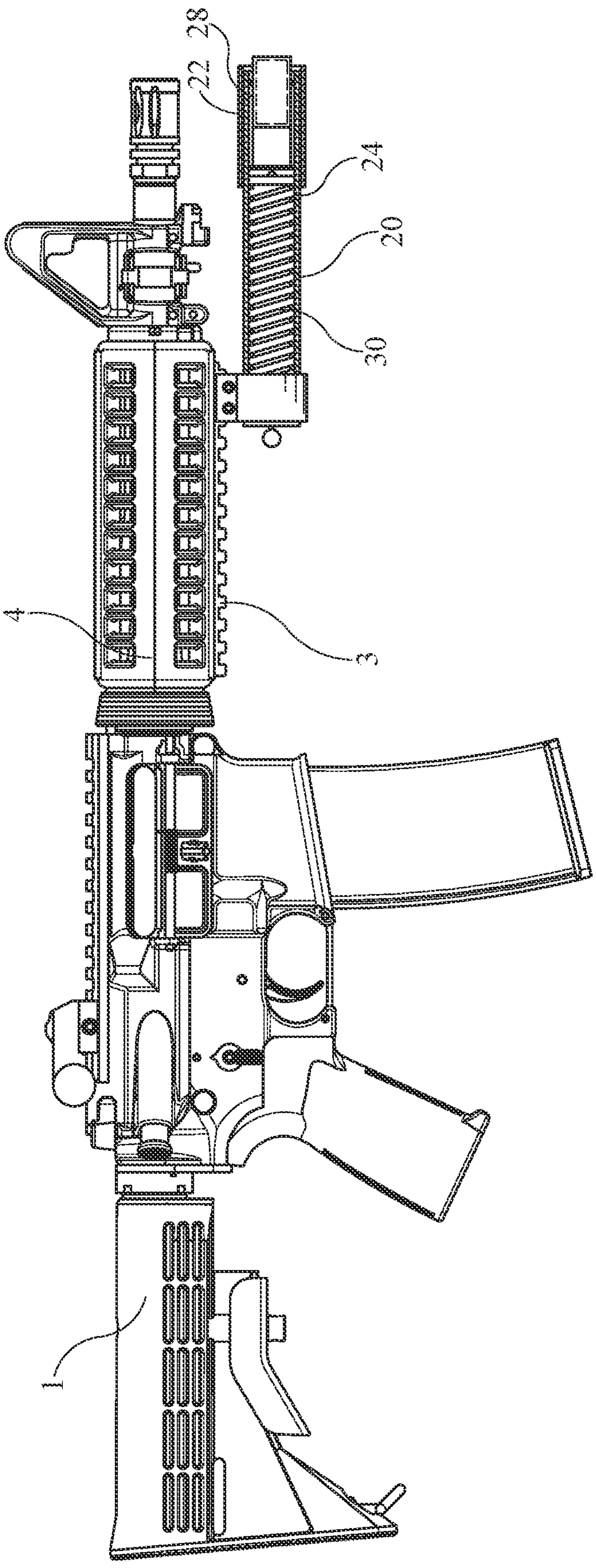
FIG. 2 depicts a weapon and breaching tool in accordance with some aspects and embodiments.
Figure 3:
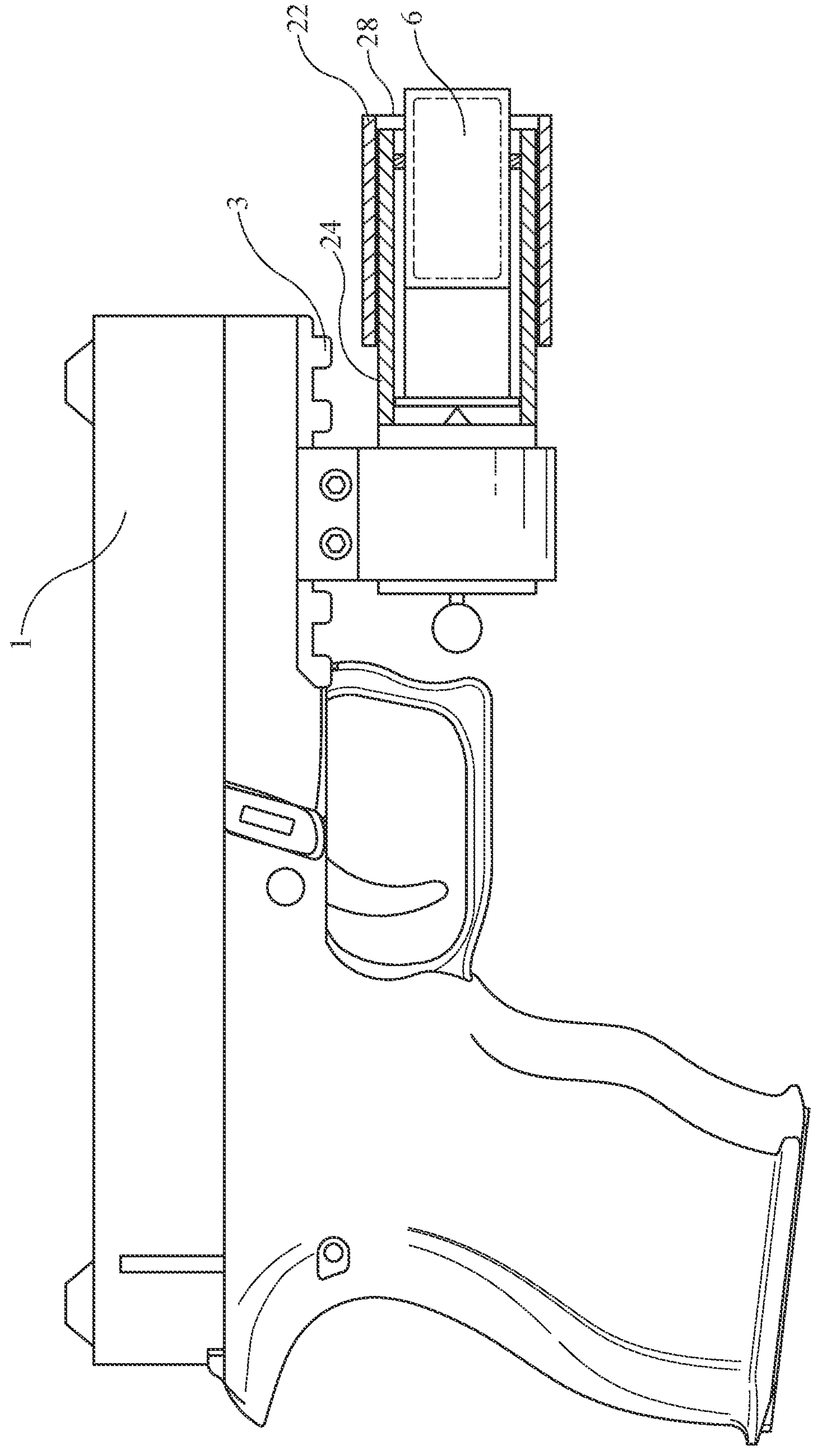
FIG. 3 depicts a weapon and breaching tool in accordance with some aspects and embodiments.
Figure 4:
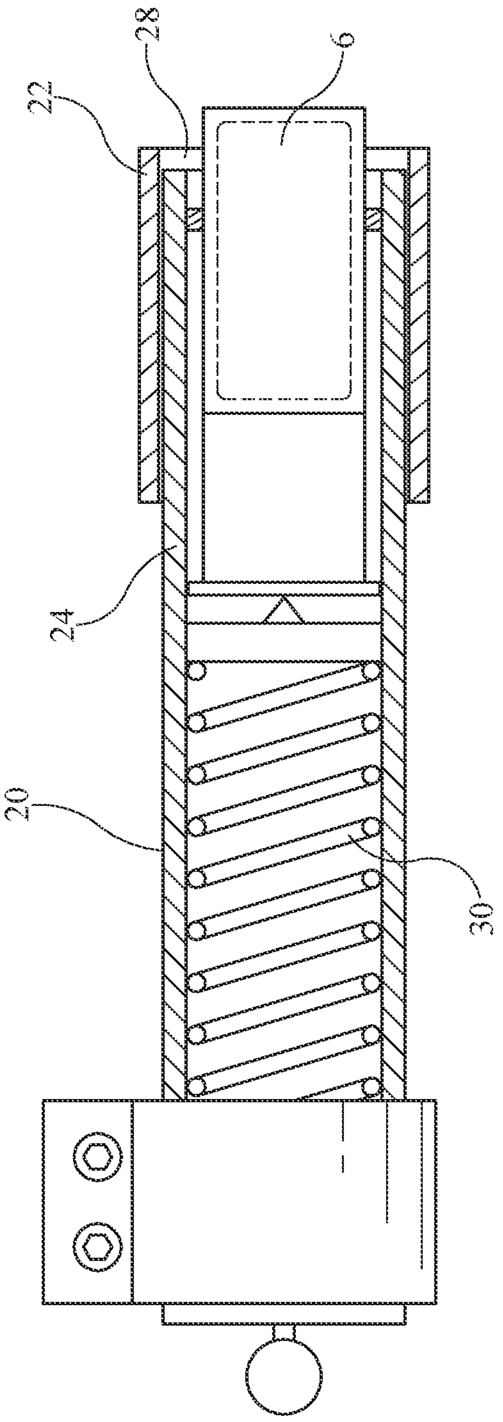
FIG. 4 depicts a breaching tool in accordance with some aspects and embodiments.

Referring now to FIG. 1 and in accordance with various embodiments a system 10 is described for a ballistic breaching tool 20 for breaching a door 2 or similar barricade that may be securely attached to a service weapon 1 so that an operator can use the breaching tool 20 while maintaining their grip on the service weapon 1. As depicted in the Figures, the system 10 disclosed herein may be used with a wide variety of weapons 1, and is not limited to use with any specific weapon 1 or weapon platform. Additionally weapon 1 may be equipped with a rail accessory mounting system 3, for example a picatinny rail, Weaver rail, M-LOK or similar mounting system, to enable quick attachment of the breaching tool to weapon 1. In some embodiments rail system 3 is secured to the underside of the weapon 1 barrel 4.

As depicted in FIGS. 1-4 and in accordance with some exemplary embodiments, a press-type breaching tool 20 may include an exterior barrel sleeve 22, and an interior barrel sleeve 24 that is adapted to be mounted to an operator's primary weapon 1, for example a rifle, carbine, submachine gun, or even pistol by securing it to rail 3. Breaching tool 20 interior sleeve 24 includes an internal spring 30 disposed therein that provides spring force against exterior barrel sleeve. Interior sleeve 20 is sized to hold a suitable breaching cartridge 6, for example, a 12 gauge shotgun shell, or similar cartridge 6 and provide spring force against cartridge 6.

In some embodiments a forward edge 28 of exterior sleeve 22 may extend approximately 1 to 2 inches beyond the muzzle of the weapon 1. In these embodiments an operator would simply hold weapon 1 in the same manner as when employing it, for example with the desired hand placement and with weapon 1 stock or butt-end 5 against the shoulder. The operator would then place forward edge 28 of exterior sleeve 22 or the breaching round itself in contact with the area nearest the deadbolt, hinge, or other target. When the operator wishes to affect the breach, he would apply forward pressure to compress breaching tool 20 internal spring 30 is compressed and the sleeve or breaching round is pushed back to contact a conventional firing pin to strike the breaching round's 6 primer. The operator then retracts weapon 1, allowing spring 30 tension to drive the sleeve 22 back into its extended position, re-engaging the device's internal firing mechanism (cocking), and expelling the fired round 6 from an ejection port (not shown) or from the front edge 28 of tool 20.

Figure 5:
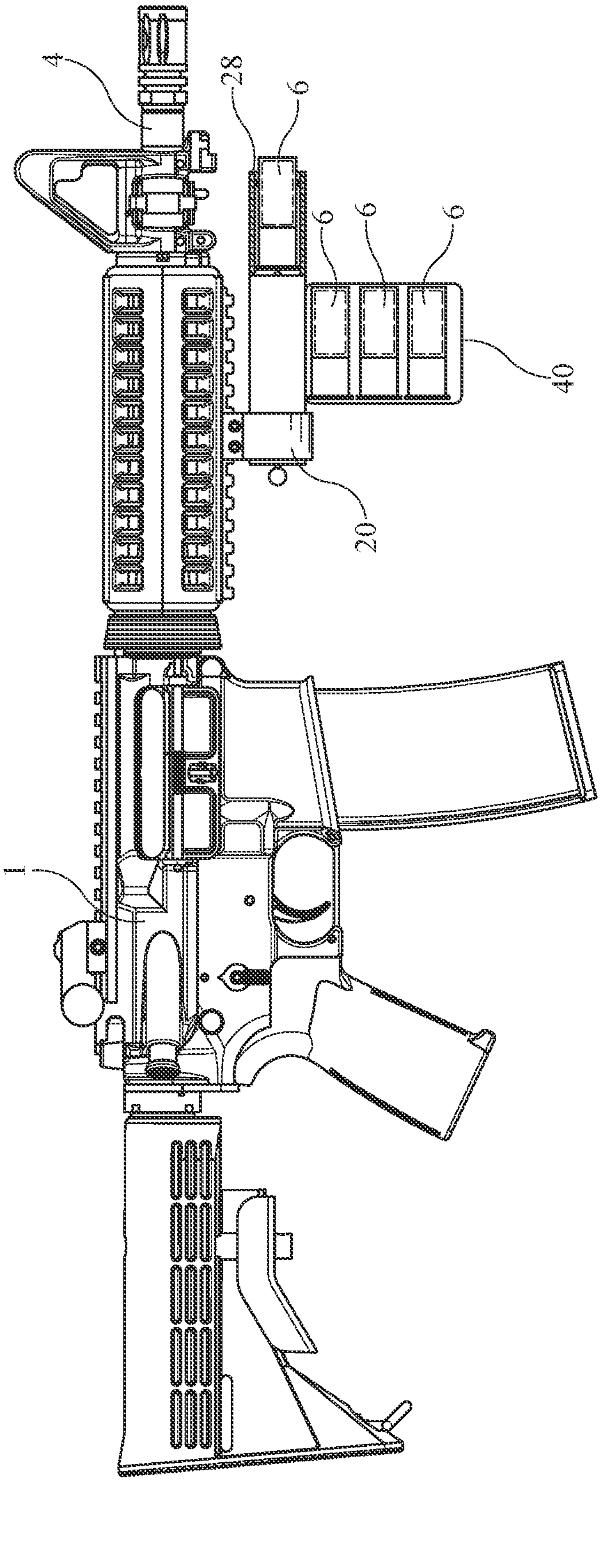
FIG. 5 depicts a weapon and breaching tool in accordance with some aspects and embodiments.
Figure 6:
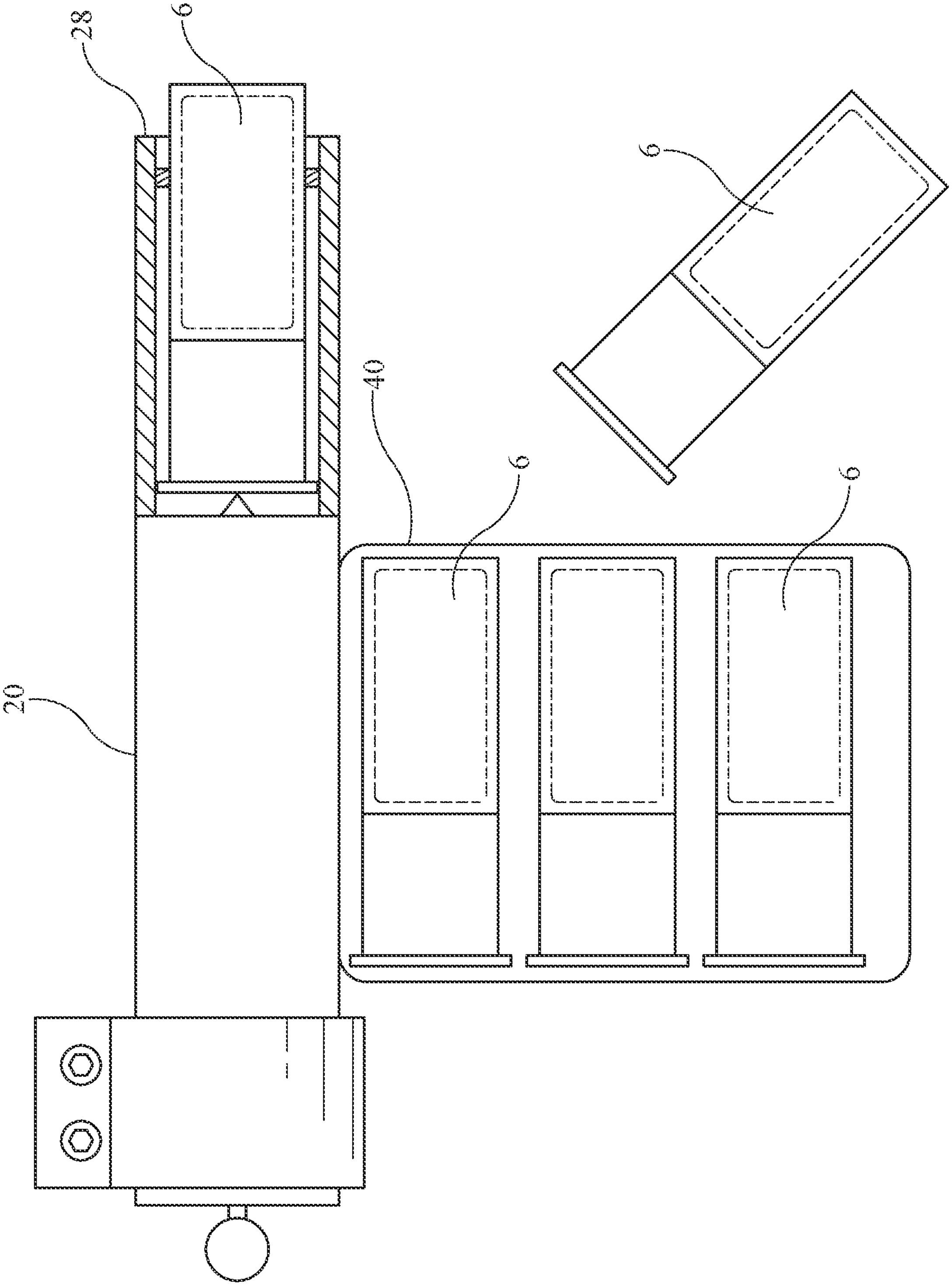
FIG. 6 depicts a breaching tool in accordance with some aspects and embodiments.

Referring now to FIGS. 5 and 6 and in accordance with some exemplary embodiments, a press-type breaching tool 20 may further include a magazine 40 that is capable of holding a plurality of cartridges 6. Magazine 40 allowing for the subsequent automatic loading of an unexpended cartridge 6 upon ejection of the expended cartridge thereby enabling semi-automatic functionality from magazine 40. In some aspects magazine 40 may be a stick type, drum type, or tube type magazine 40 that is in communication with interior sleeve 24 for feeding cartridges into interior sleeve 24 once a spent cartridge 6 is ejected. In operation, the leading edge of the breaching round 6 is placed against the area targeted for breach and the operator applies forward pressure until the loaded cartridge 6 is fired, and relax pressure until the expended cartridge is ejected; whereby magazine 40 feeds a new cartridge 6 into the now empty interior sleeve 24. The operator need only change magazines 40 when the ammunition in their breaching tool 20 has been exhausted.

Figure 7:
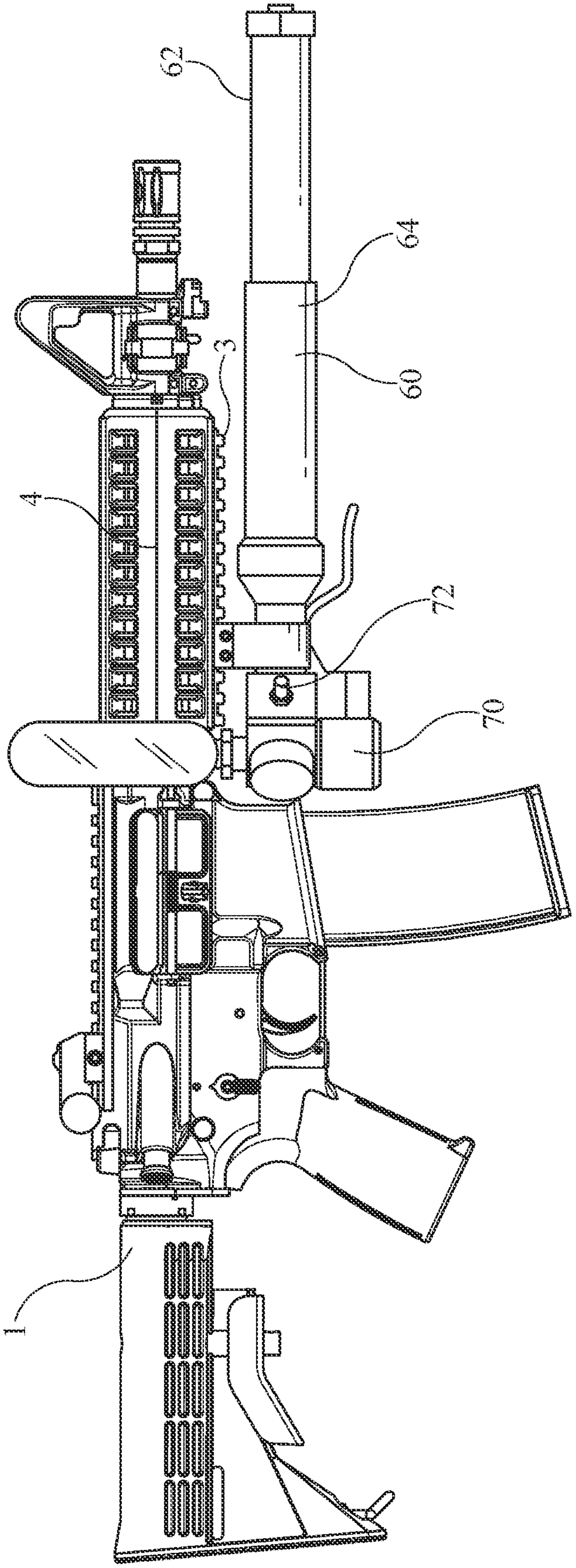
FIG. 7 depicts a weapon and breaching tool in accordance with some aspects and embodiments.
Figure 8:
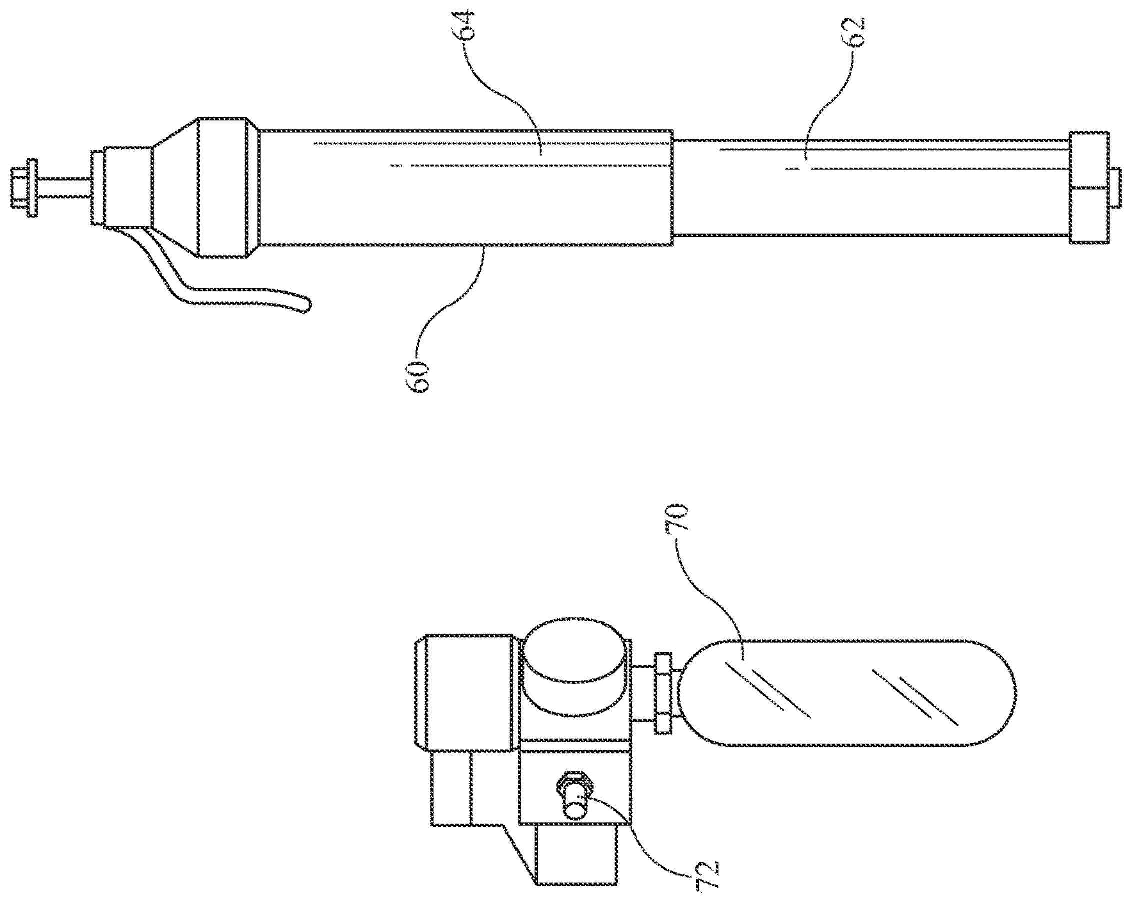
FIG. 8 depicts a breaching tool in accordance with some aspects and embodiments.

Referring to FIGS. 7 and 8 and in accordance with some additional embodiments a captive bolt breaching head 60 is secured to rail 3 underneath weapon 1. Captive bolt breaching head 60 includes an extendable bolt or rod 62 that is expelled from a bolt tube 64. In some embodiments a compressed air tank 70 includes a switch or button 72 that, when actuated, supplies a charge of compressed air into bolt tube 64 thereby forcing rod 62 forward. In some embodiments various different rod sizes and materials may be employed, such as steel, carbon fiber, or any number of known materials having sufficient strength to effect the breach. In some aspects captive bolt 60 can utilize a blank cartridge or electromagnetic rail system in place of compressed air to operate rod 62. Use of a captive bolt breaching head avoids risk of fragmentation entering the target which can be particularly important in scenarios where targeted individuals may be intermixed with innocent, non-targeted individuals such as non-combatants.

Figure 9:
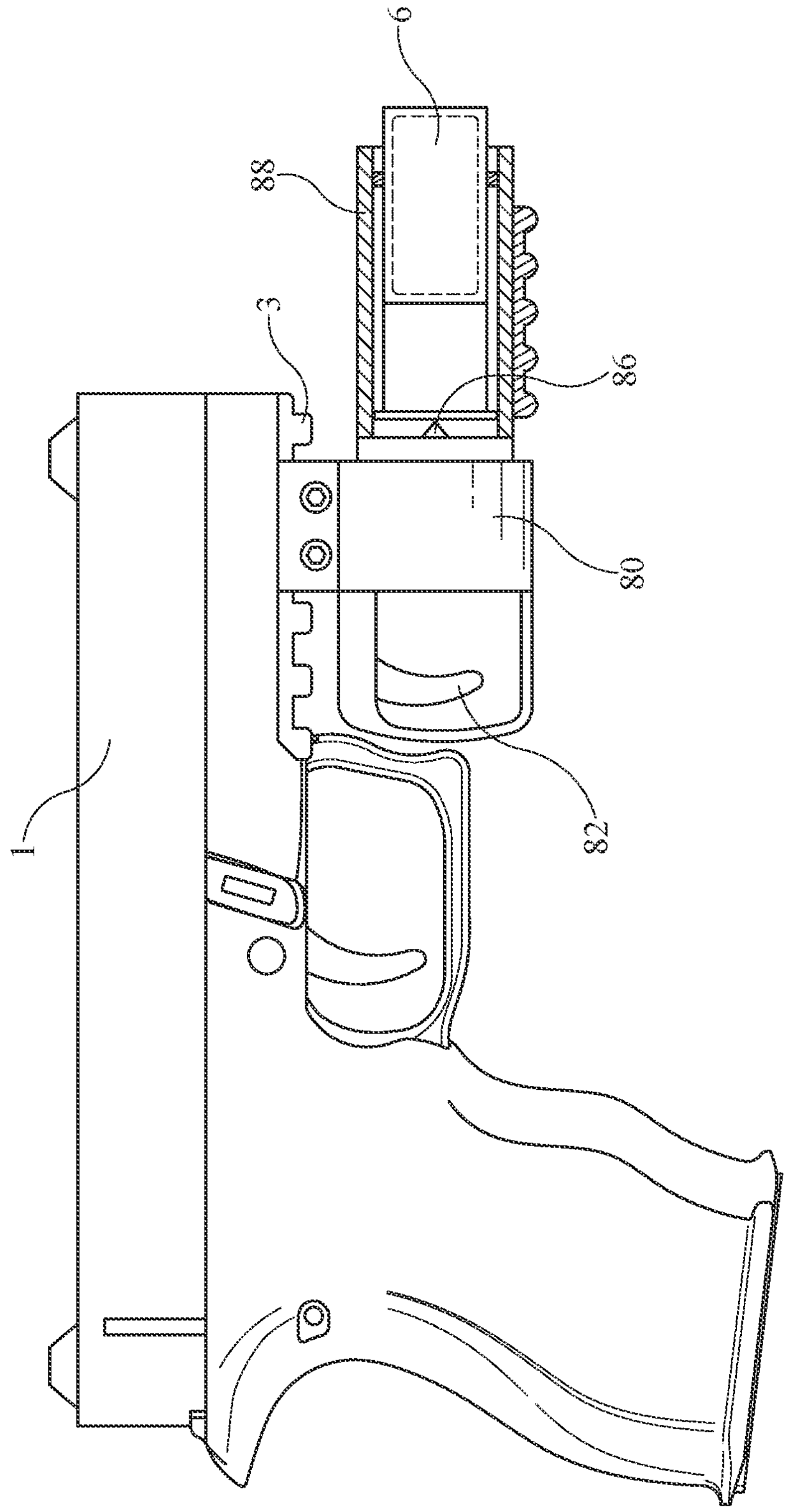
FIG. 9 depicts a weapon and breaching tool in accordance with some aspects and embodiments.
Figure 10:
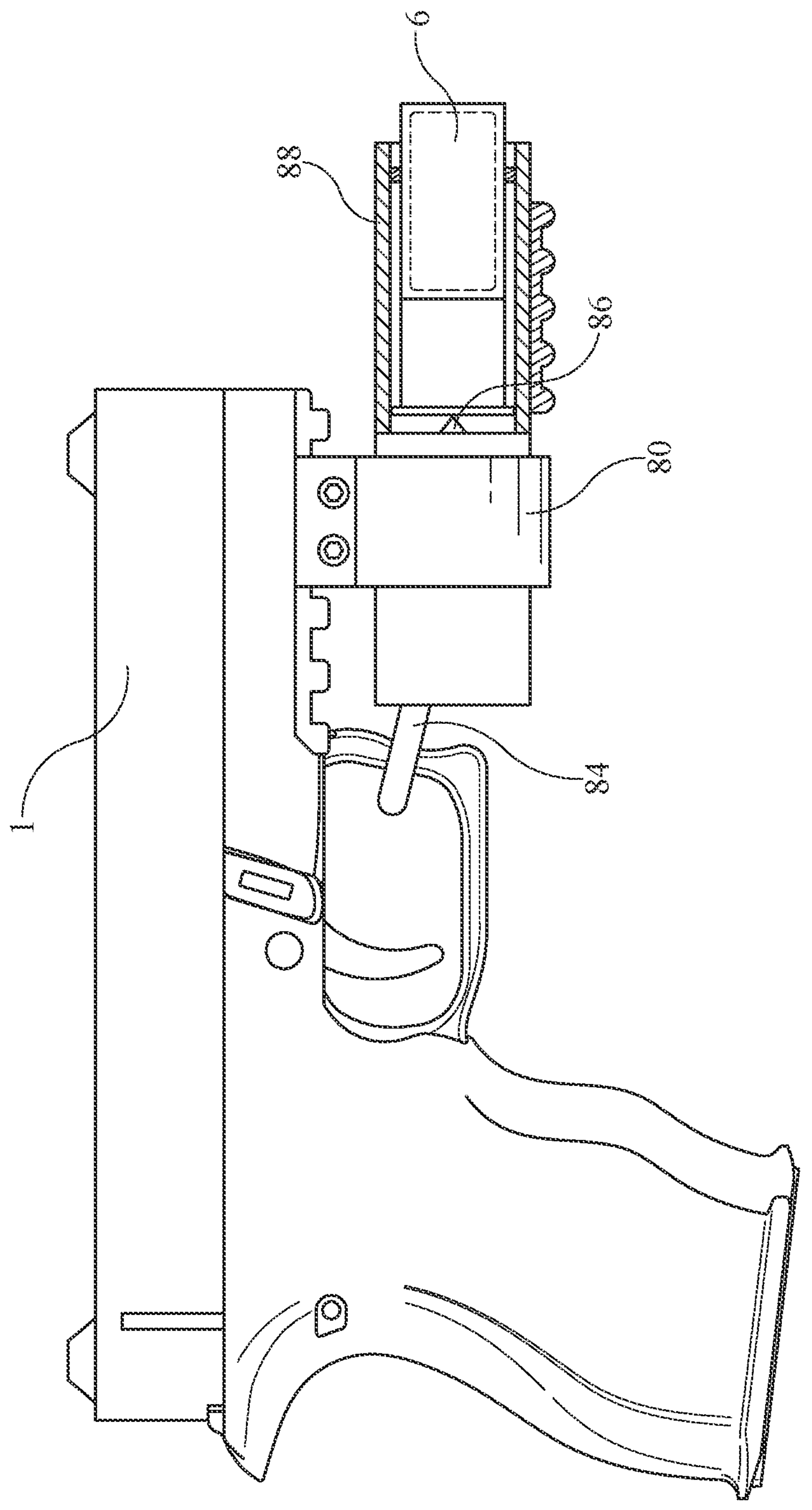
FIG. 10 depicts a breaching tool in accordance with some aspects and embodiments.
Figure 11:
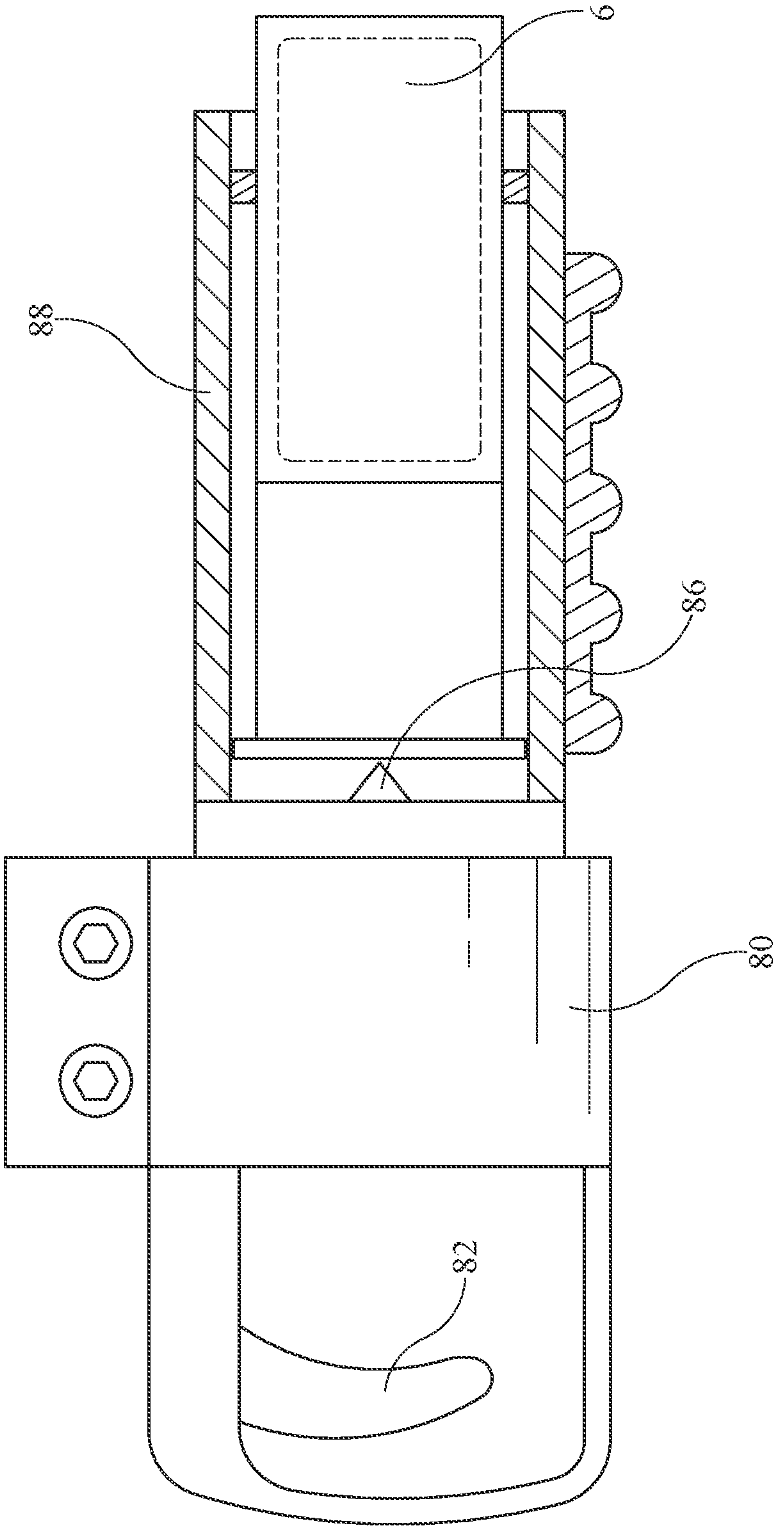
FIG. 11 depicts a breaching tool in accordance with some aspects and embodiments.

Referring now to FIGS. 9-11 in some embodiments a breaching tool 80 that is constructed as a miniaturized M203 grenade launcher. In these embodiments breaching tool 80 is provided with a trigger 82 or switch 84 that actuates a firing pin 86, thereby firing cartridge or round 6 from tube 88. In one embodiment breaching tool 80 can readily be secured to a pistol 1 as a breaching entry tool for officers, agents, or other law enforcement personnel that employ a pistol as their primary clearance weapon 1. In these embodiments breaching tool 80 could be cocked when tube 88 is fully extended, loaded with a cartridge 6 (e.g. 12 GA shotgun breaching ammunition), and the tube 88 pulled rearwardly and locked. Breaching tool 80 trigger can then be depressed to engage the firing mechanism and send the firing pin 86 into cartridge 6 primer to fire the cartridge 6 into the target 2.

Trigger 82 could alternatively comprise a V-shaped "butterfly" trigger (similar to the M2 Browning heavy machine gun) located forward of the pistol's own trigger guard. Trigger 82 could allow for the firing pin to strike the primer of the breaching round or alternatively it could allow for greater motion of the breaching round or tube containing the breaching round. Once depressed that "trigger" could allow the round or the entire tube to slide rearwardly and into a static, exposed firing pin 86. In these embodiments firing would require the operator to place the tube 88 or the leading edge of an exposed breaching round 6 against the target 2 surface and apply rapid pressure such that the round's primer makes contact with firing pin 86 with sufficient force to ignite and cause the breaching round to be fired. This "bangstick" style configuration is very easy to deploy while the operator maintains his grip on weapon 1.

In some embodiments a plurality of different projectiles may be fired from breaching tools 20, 60, 80 wherein the tools can be used as either a defensive weapon or an offensive weapon 1, or simply a breaching tool, as designed.

While a variety of inventive embodiments have been described and illustrated herein, those of ordinary skill in the art will understand that a variety of other methods, systems, and/or structures for performing the function and/or obtaining the results, and/or one or more of the advantages described herein are possible, and further understand that each of such variations and/or modifications is within the scope of the inventive embodiments described herein. Those skilled in the art will understand that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative only and other embodiments may be selected without departing from the scope of the present invention, as set forth in the claims appended hereto.

The invention claimed is:

1. A breaching system for a weapon having a barrel comprising:

a breaching tool secured to said weapon at a point proximate said barrel, said breaching tool having an exterior sleeve portion that is slidable towards a rear end of said weapon for firing said breaching implement; and wherein said sleeve portion extends beyond a terminal end of said weapon barrel.

2. A system as claimed in claim 1 comprising:

an internal spring for biasing said sleeve portion away from a stationary firing mechanism, whereby the act of forcing said sleeve portion rearwardly against said spring and into said stationary firing mechanism fires said breaching implement.

3. A breaching system for a weapon having a barrel and an accessory attachment rail comprising:

a breaching implement secured to said rail at a point proximate said barrel, said breaching implement having an exterior sleeve portion that is slidable towards a rear end of said weapon for firing a breaching cartridge from said breaching implement; and wherein said sleeve portion extends beyond a terminal end of said weapon barrel.

4. A system as claimed in claim 3 comprising:

an internal spring for biasing said sleeve portion away from a stationary firing mechanism and a magazine containing a plurality of breaching cartridges whereby the act of forcing said sleeve portion rearwardly against said spring fires said breaching implement.

* * * * *